US012416239B1

(12) United States Patent
Elnajjar

(10) Patent No.: US 12,416,239 B1
(45) Date of Patent: Sep. 16, 2025

(54) COOLING SYSTEM HAVING A VORTEX TUBE AND A FLUIDIC OSCILLATOR FOR GAS TURBINE BLADES

(71) Applicant: United Arab Emirates University, Al Ain (AE)

(72) Inventor: Emad Elnajjar, Al Ain (AE)

(73) Assignee: UNITED ARAB EMIRATES UNIVERSITY, Al-Ain (AE)

( * ) Notice: Subject to any disclaimer, the term of this patent is extended or adjusted under 35 U.S.C. 154(b) by 0 days.

(21) Appl. No.: 19/196,145

(22) Filed: May 1, 2025

(51) Int. Cl.
*F01D 5/18* (2006.01)
*B05B 1/08* (2006.01)

(52) U.S. Cl.
CPC ................ *F01D 5/187* (2013.01); *B05B 1/08* (2013.01); *F05D 2260/201* (2013.01); *F05D 2260/209* (2013.01)

(58) Field of Classification Search
CPC ..... B05B 1/08; F01D 5/187; F05D 2260/201; F05D 2260/209
See application file for complete search history.

(56) References Cited

U.S. PATENT DOCUMENTS 4,818,178 A 4/1989 Sibbertsen
5,397,217 A 3/1995 DeMarche
7,128,082 B1 10/2006 Cerretelli et al.
7,128,533 B2 * 10/2006 Liang ...................... F01D 5/186 416/97 R
11,454,171 B1 * 9/2022 Rutledge ................... F02C 7/18
11,865,556 B2 * 1/2024 Hossain .................... F01D 5/16
12,012,895 B1 6/2024 Rutledge et al.
2010/0068066 A1 3/2010 Bunker
2015/0068629 A1 * 3/2015 Kottilingam ............ B22F 5/009 219/76.14

OTHER PUBLICATIONS

Tavakoli et al., "Heat transfer enhancement of a channel via vortex-based fluidic oscillator: A numerical study", Applied Thermal Engineering, vol. 243, Article 122645, Apr. 15, 2024, 12 pages.
Fuqua, "Application of Vortex Tubes to Gas Turbine Film Cooling", Dissertation, AFIT-ENY-21-S-093, Graduate School of Engineering and Management, Air Force Institute of Technology, Sep. 16, 2021, 358 pages.

* cited by examiner

*Primary Examiner* — Eldon T Brockman
(74) *Attorney, Agent, or Firm* — MH2 Technology Law Group, LLP

(57) ABSTRACT

A cooling system for a gas turbine is disclosed comprising a vortex tube defining a body having an inlet port connectable to a compressor to receive compressed fluid. The vortex tube is configured to separate flow of the compressed fluid into a cold stream and a hot stream. The cooling system further includes a fluidic oscillator in fluid communication with the vortex tube, the first end of which is connected to a cold stream outlet port of the vortex tube to receive the cold stream. The fluidic oscillator is configured to generate at least two oscillator jets of the cold stream, operating at different oscillation frequencies, to produce biaxial pulsating flow oscillations onto a surface of at least one gas turbine blade of the gas turbine. A more efficient cooling system will result from the proposed cooling system's increased cooling impinging surface area and significantly reduced cooling fluid temperature differential.

19 Claims, 6 Drawing Sheets

COOLING SYSTEM HAVING A VORTEX TUBE AND A FLUIDIC OSCILLATOR FOR GAS TURBINE BLADES

TECHNOLOGICAL FIELD

The present disclosure in general relates to the field of a gas turbine. More particularly, the present disclosure is directed towards a cooling system for gas turbine blades of the gas turbine.

BACKGROUND

The information in this section merely provides background information related to the present disclosure and may not constitute prior art(s) for the present disclosure.

Gas turbines are widely employed in power generation and in aerospace applications due to their favorable thermal efficiency and mechanical reliability. In order to improve the overall thermal efficiency of a gas turbine, manufacturers have increased the operating temperatures of the turbine. However, this increase in turbine inlet temperature introduces higher thermal loads on various turbine components. Since cooling effectiveness is strongly dependent on the thermal temperature gradient between the cooling medium and the hot gas path, the increased operating temperatures also pose significant challenges to maintaining adequate cooling performance. In particular, a turbine blade is exposed to elevated thermal stresses, and a leading edge of the turbine blade encounters the most intense heat flux due to direct exposure to high-temperature combustion gases.

To manage thermal loads in the turbine blade, various internal cooling techniques have been employed. One conventional technique includes impingement cooling, in which one or more jets of compressed air impinge upon internal surfaces of the turbine blade. The impingement cooling method is especially effective at cooling the leading-edge region of the turbine blade and has been studied extensively. Parameters such as diameter of an impingement nozzle, spacing between multiple impingement nozzles, distance from the nozzle to a target surface, and a curvature of the target surface all influence the resulting heat transfer performance.

Recent developments in the field of turbine blade cooling have introduced self-oscillating jet mechanisms. One such mechanism includes a sweeping jet generated by a fluidic oscillator. A sweeping jet periodically moves across the impingement surface and enhances turbulence intensity, thereby increasing the effective heat transfer area and improving surface temperature uniformity. In comparison to steady-state impinging jets, the sweeping jet provides enhanced cooling effectiveness.

However, conventional impingement systems typically utilize relatively hot compressed air, which reduces overall cooling potential. The compressor discharges the compressed air stream at a relatively high temperature. Since the high temperature compressed air stream from the compressor is used to cool the gas turbine blades, it is one of the primary challenges associated with gas turbine blade cooling. Due to the temperature of the compressed cooling air being relatively high, the temperature differential remains small, and the heat transfer rate is limited. Furthermore, the steady nature of conventional jets also results in uneven surface temperature profiles and associated thermal stresses. Accordingly, there exists a need for an improved turbine blade cooling system.

Present disclosure is directed to overcome one or more limitations stated above or any other limitations associated with the known arts.

GENERAL DESCRIPTION

One or more shortcomings of the prior art are overcome by a device and a method as claimed and additional advantages are provided through the present disclosure. Additional features and advantages are realized through the techniques of the present disclosure. Other embodiments, implementations and aspects of the disclosure are described in detail herein and are considered a part of the claimed disclosure.

A first aspect of the disclosure concerns a cooling system for a gas turbine. The cooling system comprises a vortex tube that defines a body having an inlet port connectable to a compressor to receive compressed fluid. The vortex tube is configured to separate the flow of the compressed fluid into a cold stream and a hot stream. The system further includes a fluidic oscillator in fluid communication with the vortex tube, wherein the fluidic oscillator defines a first end, a second end, and at least two outlet passages. The first end of the fluidic oscillator is connected to a cold stream outlet port of the vortex tube to receive the cold stream. The fluidic oscillator is configured to generate at least two oscillator jets of the cold stream, operating at different oscillation frequencies, to produce biaxial pulsating flow oscillations onto a surface of at least one gas turbine blade of the gas turbine.

According to a configuration of the first aspect, the at least two outlet passages are oriented orthogonal to one another.

According to a configuration of the first aspect, the at least two outlet passages of the fluidic oscillator are configured to generate at least two oscillator jets.

According to a configuration of the first aspect, the fluidic oscillator includes a flow passage defining an internal flow network configured to split the cold stream toward the at least two outlet passages.

According to a configuration of the first aspect, the internal flow network comprises curved bifurcation paths configured to induce a phase shift between the at least two oscillator jets emitted from the at least two outlet passages.

According to a configuration of the first aspect, the fluidic oscillator comprises a nozzle positioned at the second end, the nozzle being configured to direct the biaxial pulsating flow oscillations onto the surface of the at least one gas turbine blade.

According to a configuration of the first aspect, the at least two oscillator jets produce biaxial sweeping jet patterns in vertical and horizontal directions over the surface of the at least one gas turbine blade.

According to a configuration of the first aspect, the fluidic oscillator is a double-sided fluidic oscillator configured to direct pulsating flow to opposing surfaces of the at least one gas turbine blade.

According to a configuration of the first aspect, the vortex tube comprises a hot stream outlet port having a throttle valve configured to control the temperature and flow rate of the cold stream.

According to a configuration of the first aspect, the fluidic oscillator is configured to be received within an internal cavity of the at least one gas turbine blade of the gas turbine.

A second aspect of the disclosure concerns a gas turbine. The gas turbine comprises at least one gas turbine blade and a cooling system in fluidic communication with the at least one gas turbine blade. The cooling system comprises a vortex tube defining a body having an inlet port connectable to a compressor to receive compressed fluid. The vortex tube is configured to separate the flow of the compressed fluid into a cold stream and a hot stream. The cooling system further includes a fluidic oscillator in fluid communication with the vortex tube. The fluidic oscillator defining a first end, a second end, and at least two outlet passages. The first end of the fluidic oscillator is connected to a cold stream outlet port of the vortex tube to receive the cold stream. The fluidic oscillator is configured to generate at least two oscillator jets of the cold stream, operating at different oscillation frequencies, to produce biaxial pulsating flow oscillations onto a surface of the at least one gas turbine blade of the gas turbine.

According to a configuration of the second aspect, the at least two outlet passages are oriented orthogonal to one another.

According to a configuration of the second aspect, the fluidic oscillator includes a flow passage defining an internal flow network configured to split the cold stream toward the at least two outlet passages.

According to a configuration of the second aspect, the internal flow network comprises curved bifurcation paths configured to induce a phase shift between the at least two oscillator jets emitted from the at least two outlet passages.

According to a configuration of the second aspect, the fluidic oscillator comprises a nozzle positioned at the second end, the nozzle being configured to direct the biaxial pulsating flow oscillations onto the surface of the at least one gas turbine blade.

According to a configuration of the second aspect, the at least two oscillator jets produce biaxial sweeping jet patterns in vertical and horizontal directions over the surface of the at least one gas turbine blade.

According to a configuration of the second aspect, the fluidic oscillator is a double-sided fluidic oscillator configured to direct pulsating flow to opposing surfaces of the at least one gas turbine blade.

According to a configuration of the second aspect, the vortex tube comprises a hot stream outlet port having a throttle valve configured to control the temperature and flow rate of the cold stream. According to a configuration of the second aspect, the fluidic oscillator is configured to be received within an internal cavity of the at least one gas turbine blade of the gas turbine.

EMBODIMENTS

The present disclosure also encompasses embodiments as defined in the following numbered phrases. It should be noted that these numbered embodiments intended to add to this disclosure and is not intended in any way to be limiting.

1. A cooling system for a gas turbine, the cooling system comprising: a vortex tube defining a body having an inlet port connectable to a compressor to receive compressed fluid, the vortex tube being configured to separate flow of the compressed fluid into a cold stream and a hot stream; and a fluidic oscillator in fluid communication with the vortex tube, the fluidic oscillator defining a first end, a second end, and at least two outlet passages, wherein the first end being connected to a cold stream outlet port of the vortex tube to receive the cold stream, and the fluidic oscillator being configured to generate at least two oscillator jets of the cold stream, operating at different oscillation frequencies, to produce biaxial pulsating flow oscillations onto a surface of at least one gas turbine blade of the gas turbine.

2. The cooling system of embodiment 1, wherein the at least two outlet passages are oriented orthogonal to one another.
3. The cooling system of embodiment 1, wherein the at least two outlet passages of the fluidic oscillator are configured to generate at least two oscillator jets.
4. The cooling system of embodiment 1, wherein the fluidic oscillator includes a flow passage defining an internal flow network configured to split the cold stream toward the at least two outlet passages.
5. The cooling system of embodiment 1, wherein the internal flow network comprises curved bifurcation paths configured to induce a phase shift between the at least two oscillator jets emitted from the at least two outlet passages.
6. The cooling system of embodiment 1, wherein the fluidic oscillator comprises a nozzle positioned at the second end, the nozzle being configured to direct the biaxial pulsating flow oscillations onto the surface of the at least one gas turbine blade.
7. The cooling system of embodiment 1, wherein the at least two oscillator jets produce biaxial sweeping jet patterns in vertical and horizontal directions over the surface of the at least one gas turbine blade.
8. The cooling system of embodiment 1, wherein the fluidic oscillator is a double-sided fluidic oscillator configured to direct pulsating flow to opposing surfaces of the at least one gas turbine blade.
9. The cooling system of embodiment 1, wherein the vortex tube comprises a hot stream outlet port having a throttle valve configured to control the temperature and flow rate of the cold stream.
10. The cooling system of embodiment 1, wherein the fluidic oscillator is configured to be received within an internal cavity of the at least one gas turbine blade of the gas turbine.
11. A gas turbine comprising: at least one gas turbine blade; and a cooling system in fluidic communication to the at least one gas turbine blade, the cooling system comprising: a vortex tube defining a body having an inlet port connectable to a compressor to receive compressed fluid, the vortex tube being configured to separate flow of the compressed fluid into a cold stream and a hot stream; and a fluidic oscillator in fluid communication with the vortex tube, the fluidic oscillator defining a first end, a second end, and at least two outlet passages, wherein the first end being connected to a cold stream outlet port of the vortex tube to receive the cold stream, and the fluidic oscillator being configured to generate at least two oscillator jets of the cold stream, operating at different oscillation frequencies, to produce biaxial pulsating flow oscillations onto a surface of the at least one gas turbine blade of the gas turbine.
12. The gas turbine of embodiment 11, wherein the at least two outlet passages are oriented orthogonal to one another.
13. The gas turbine of embodiment 11, wherein the fluidic oscillator includes a flow passage defining an internal flow network configured to split the cold stream toward the at least two outlet passages.
14. The gas turbine of embodiment 11, wherein the internal flow network comprises curved bifurcation paths configured to induce a phase shift between the at least two oscillator jets emitted from the at least two outlet passages.

15. The gas turbine of embodiment 11, wherein the fluidic oscillator comprises a nozzle positioned at the second end, the nozzle being configured to direct the biaxial pulsating flow oscillations onto the surface of the at least one gas turbine blade.
16. The gas turbine of embodiment 11, wherein the at least two oscillator jets produce biaxial sweeping jet patterns in vertical and horizontal directions over the surface of the at least one gas turbine blade.
17. The gas turbine of embodiment 11, wherein the fluidic oscillator is a double-sided fluidic oscillator configured to direct pulsating flow to opposing surfaces of the at least one gas turbine blade.
18. The gas turbine of embodiment 11, wherein the vortex tube comprises a hot stream outlet port having a throttle valve configured to control the temperature and flow rate of the cold stream.
19. The gas turbine of embodiment 11, wherein the fluidic oscillator is configured to be received within an internal cavity of the at least one gas turbine blade of the gas turbine.

BRIEF DESCRIPTION OF DRAWINGS

In order to better understand the subject matter that is disclosed herein and to exemplify how it may be carried out in practice, embodiments will now be described, by way of non-limiting examples only, with reference to the accompanying drawings, in which.

DETAILED DESCRIPTION OF EMBODIMENTS

The present disclosure relates to a cooling system 100 for a gas turbine 200 in accordance with an exemplary implementation of the present disclosure. Cooling systems are crucial in gas turbines because they help manage the high temperatures generated during turbine operation. These systems protect sensitive turbine components, such as blades and vanes, from excessive thermal stresses that could lead to material degradation or failure. By maintaining optimal operating temperatures, the cooling system enhances the turbine's performance, longevity, and overall efficiency.

The following detailed description is provided to enable any person skilled in the art to make and use the invention and sets forth the best modes contemplated by the inventor for carrying out the invention. Various modifications to the embodiments described herein will be readily apparent to those skilled in the art, and the generic principles defined herein may be applied to other embodiments without departing from the spirit or scope of the invention. Accordingly, the present invention is not intended to be limited to the embodiments shown but is to be accorded the widest scope consistent with the principles and features disclosed herein.

The gas turbine 200 includes a turbine casing. The turbine casing houses a plurality of gas turbine blades 204. The plurality of gas turbine blades 204 are subject to extremely high temperatures during turbine operation, necessitating an effective thermal management solution to ensure performance, efficiency, and longevity. The cooling system 100 is configured to address these thermal challenges and can be either integrated within the turbine casing or mounted externally, depending on the specific parameters, operational conditions, and spatial constraints of the turbine assembly. This flexibility in installation allows the cooling system 100 to be adapted to a variety of turbine configurations, enhancing its applicability across different turbine models and operating environments.

Figure 1:
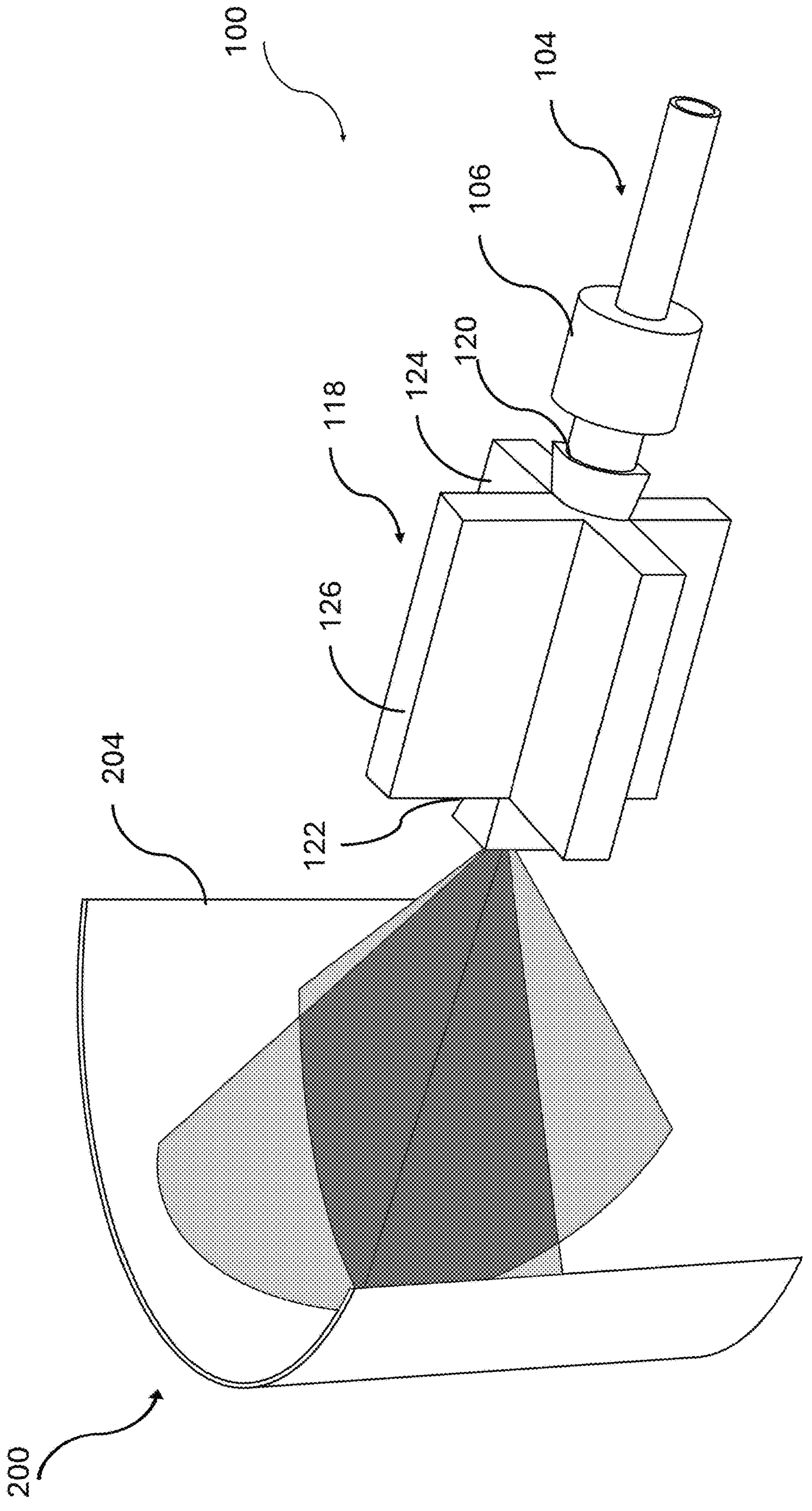
FIG. 1 illustrates a perspective view of a cooling system for a gas turbine blade comprising a vortex tube and a fluidic oscillator, according to an example of the present disclosure.
Figure 2:
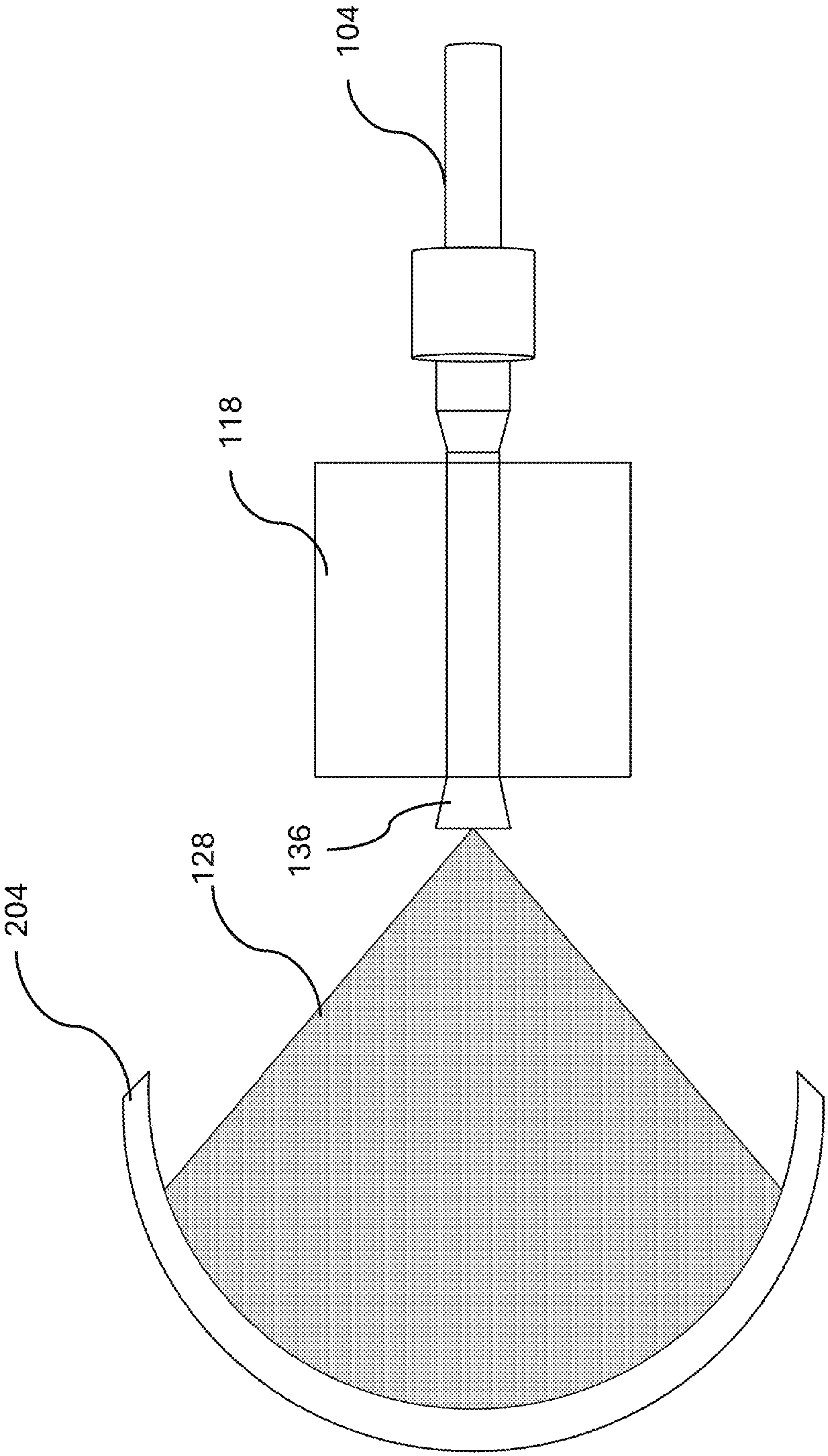
FIG. 2 illustrates a top view of the cooling system for the gas turbine blade, in accordance with an example of the present disclosure.
Figure 3:
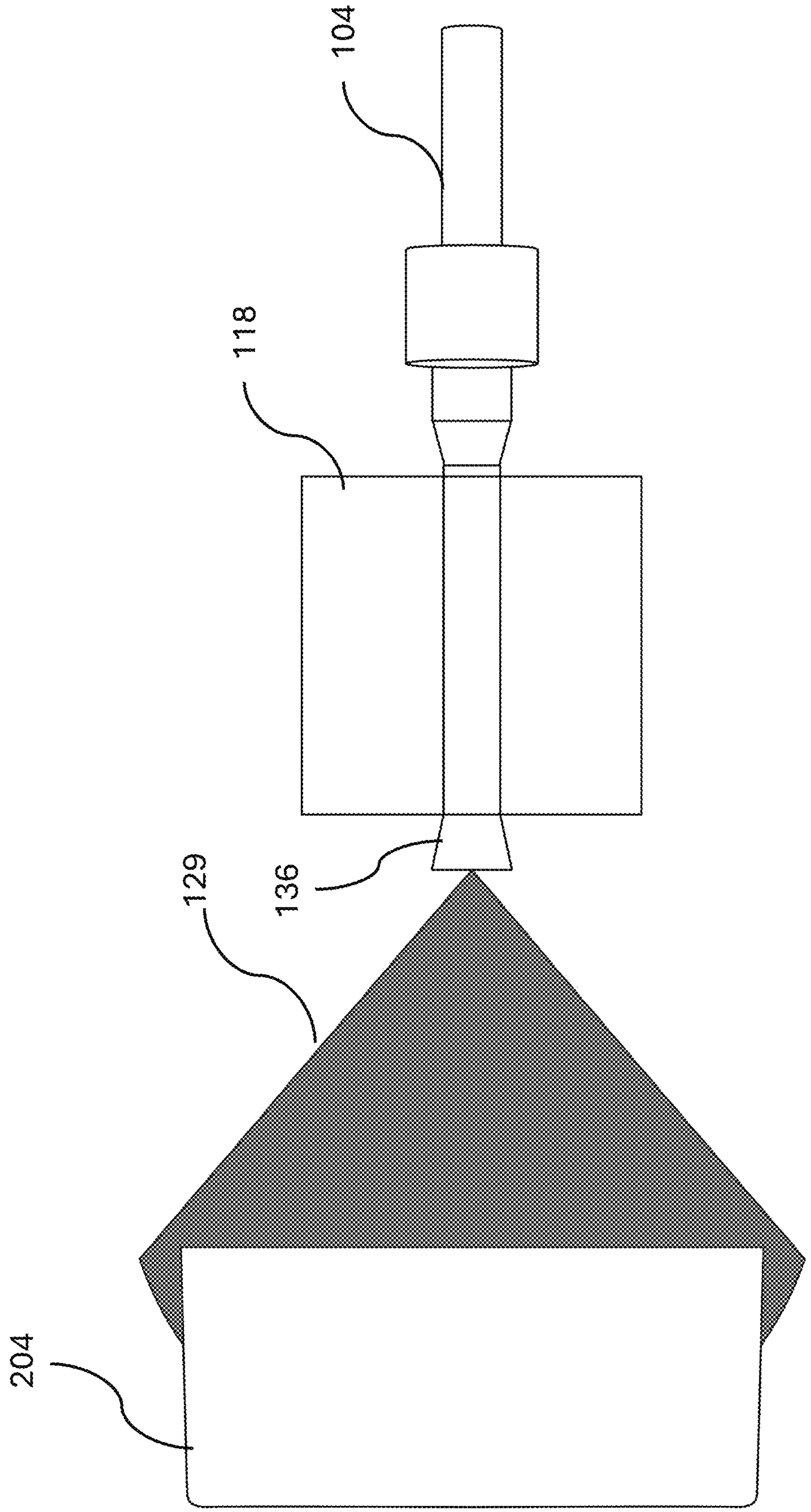
FIG. 3 illustrates a side view of the cooling system for the gas turbine blade, in accordance with an example of the present disclosure.

Referring to FIG. 1 to FIG. 3, the cooling system 100 is configured to deliver biaxial pulsating cooling flow directed onto a surface of at least one gas turbine blade 204 of the gas turbine 200. This configuration aims to enhance heat transfer efficiency and ensure more effective thermal regulation of the turbine's critical components, which are often subjected to extreme temperatures during operation. This results in more uniform blade temperature distribution, reduced thermal stresses, and extended service life of critical turbine components. The implementation of biaxial pulsating flow also allows for improved coolant utilization, potentially reducing the required flow rate while achieving superior cooling performance.

The cooling system 100 comprises a vortex tube 104, and a fluidic oscillator 118. In one implementation, the vortex tube 104 is connected to a compressor 102. The compressor 102 receives intake fluid, compresses it, and discharges it to the vortex tube 104. In one implementation, at least a portion of the compressed fluid is supplied to the vortex tube 104. The vortex tube 104 is operated to generate a temperature-separated air stream by splitting compressed air into hot and cold flow streams. This enables the delivery of a cooled air stream without the need for refrigerants or complex mechanical systems. The cold air stream is then modulated using the fluidic oscillator 118. The fluidic oscillator 118 is responsible for inducing controlled, periodic fluctuations in the flow direction and velocity of the cooling air. The cooling system 100 combines the vortex tube 104 and the fluidic oscillator 118 for gas turbine blade cooling.

Figure 4:
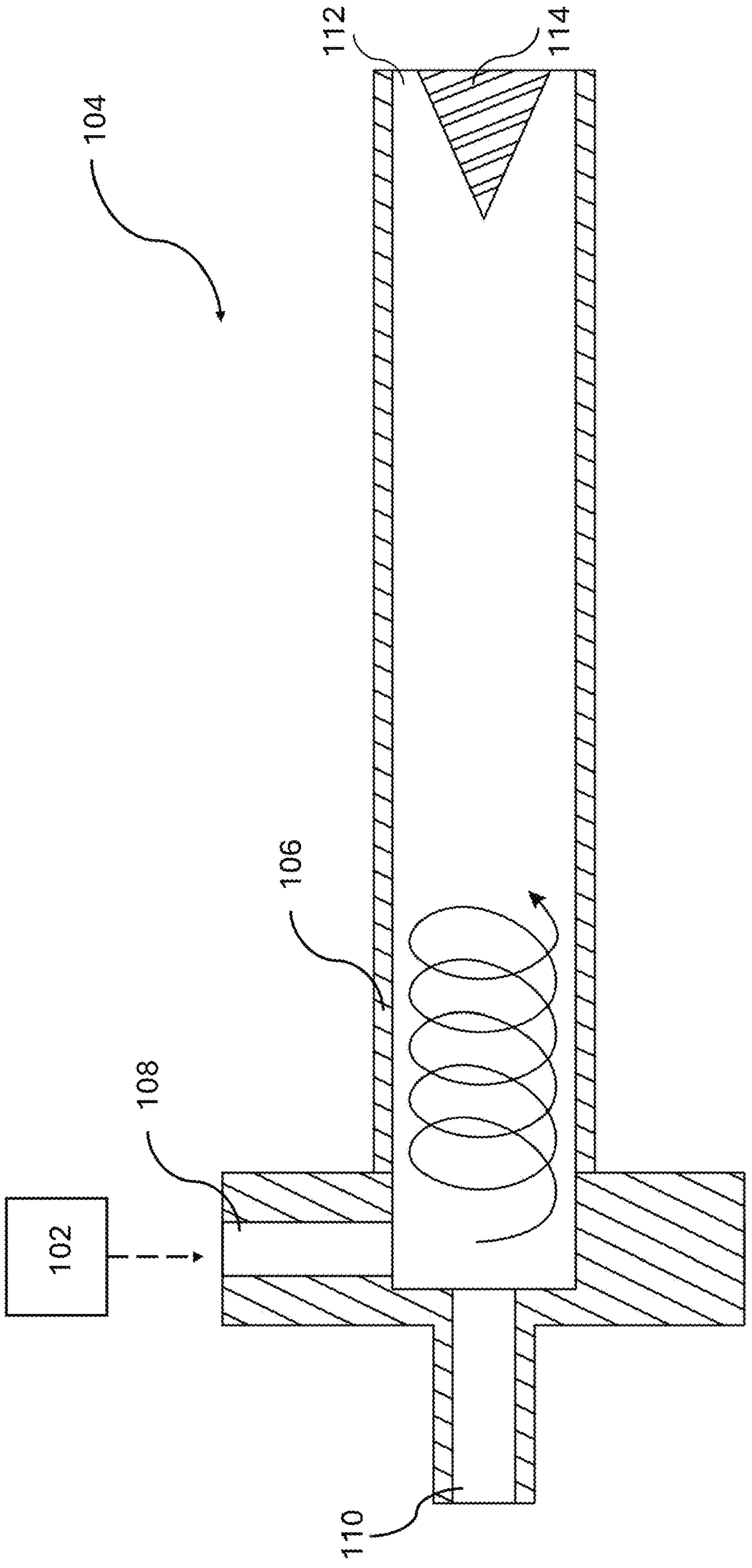
FIG. 4 illustrates a sectional view of the vortex tube, in accordance with an example of the present disclosure.

Referring to FIG. 1 along with FIG. 4, the vortex tube 104 defines a body 106 having an inlet port 108, a first outlet port 110 [also referred to as 'cold stream outlet port 110' hereinafter in the present disclosure], and a second outlet port 112 [also referred to as 'hot stream outlet port 112' hereinafter in the present disclosure]. The inlet port 108 is fluidly connected to the compressor 102. The compressor 102 supplies high-pressure compressed fluid into the vortex tube 104. In one implementation, the compressed fluid is an air stream supplied from the compressor 102. Compressed air enters the vortex tube 104 through the inlet port 108 tangentially.

The vortex tube 104 induces high-speed rotational motion of the airflow within the body 106. This motion operates based on the Ranque-Hilsch principle. The rotation separates the flow of the compressed fluid into a cold stream and a hot stream. The hot stream exits through the second outlet port 112. The cold stream exits through the first outlet port 110, showing a significant drop in temperature. This temperature reduction makes the cold stream suitable for cooling the turbine blade surfaces. Relative flow rates and temperatures of these two streams are typically adjustable by controlling the flow of the hot stream. In one implementation, the hot stream outlet port 112 comprises a throttle valve 114 configured to control the temperature and flow rate of the cold stream.

The cooling system 100 directs the cold stream from the first outlet port 110 of the vortex tube 104 into the fluidic oscillator 118. The fluidic oscillator 118 is in fluid communication with the vortex tube 104. The fluidic oscillator 118 defines a first end 120, a second end 122, and at least two outlet passages 124 and 126. The first end 120 is connected to the cold stream outlet port 110 of the vortex tube 104, enabling it to receive a cold stream of the compressed fluid. Once the cold stream enters the fluidic oscillator 118, it is divided and directed into at least two oscillator jets 128 and 129. In one implementation, the at least two outlet passages 124 and 126 are oriented orthogonal to one another. In one implementation, the fluidic oscillator 118 is configured to be received within an internal cavity of the at least one gas turbine blade 204 of the gas turbine 200.

In one implementation, the at least two outlet passages 124 and 126 of the fluidic oscillator 118 are configured to generate at least two oscillator jets 128 and 129. The at least two oscillator jets 128 and 129 are configured to oscillate at different frequencies, generating independent pulsations. As a result, the fluidic oscillator 118 produces biaxial pulsating flow oscillations, which are directed onto the surface of at least one gas turbine blade 204 of the gas turbine 200. The biaxial pulsating cooling jet enhances heat transfer efficiency, improving the cooling performance and contributing to the overall reliability and longevity of the turbine blade 204 under high-temperature operating conditions.

Figure 5:
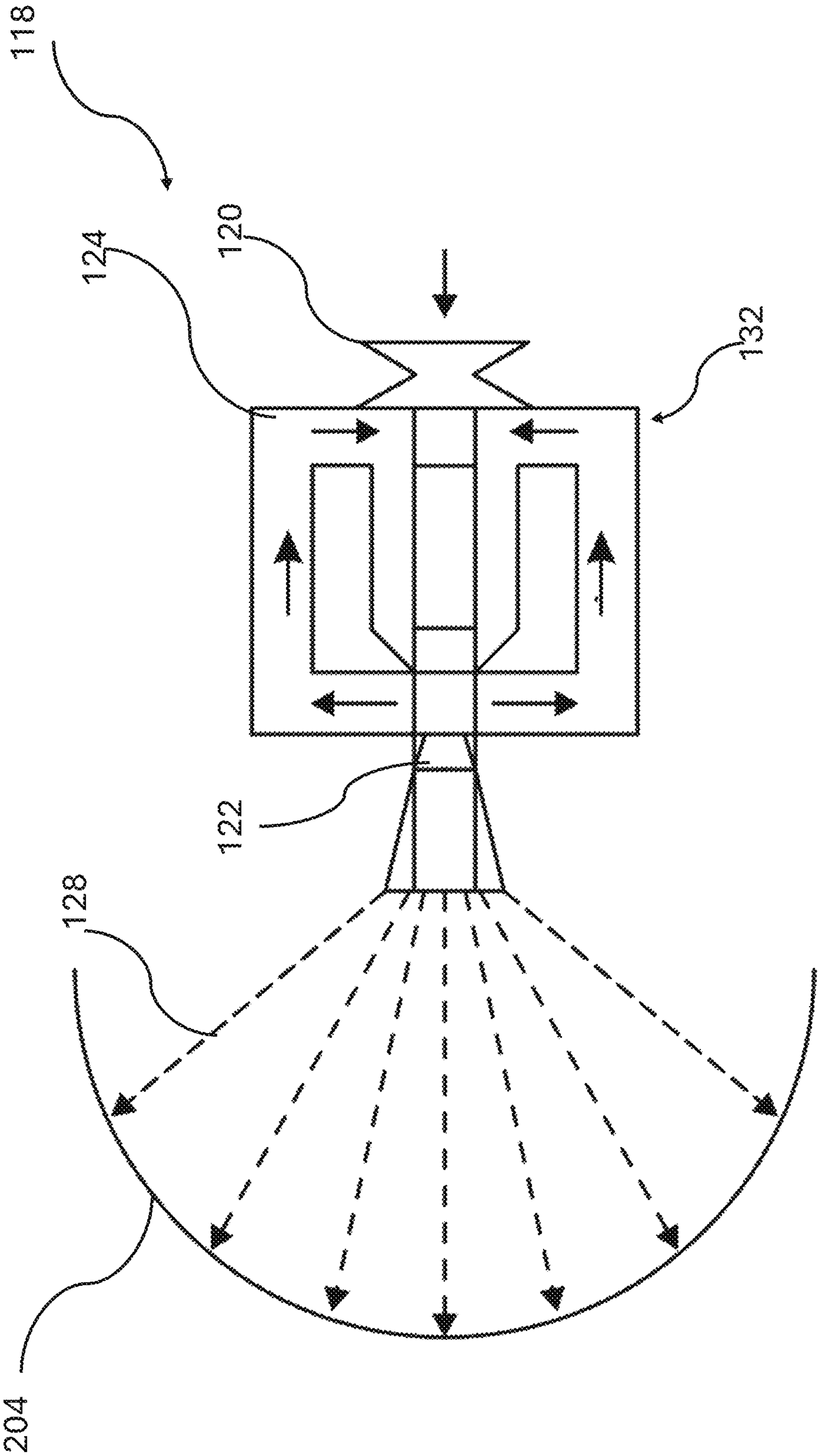
FIG. 5 illustrates a top view of the fluidic oscillator defining a first loop to induce a horizontal sweeping motion, in accordance with an example of the present disclosure.
Figure 6:
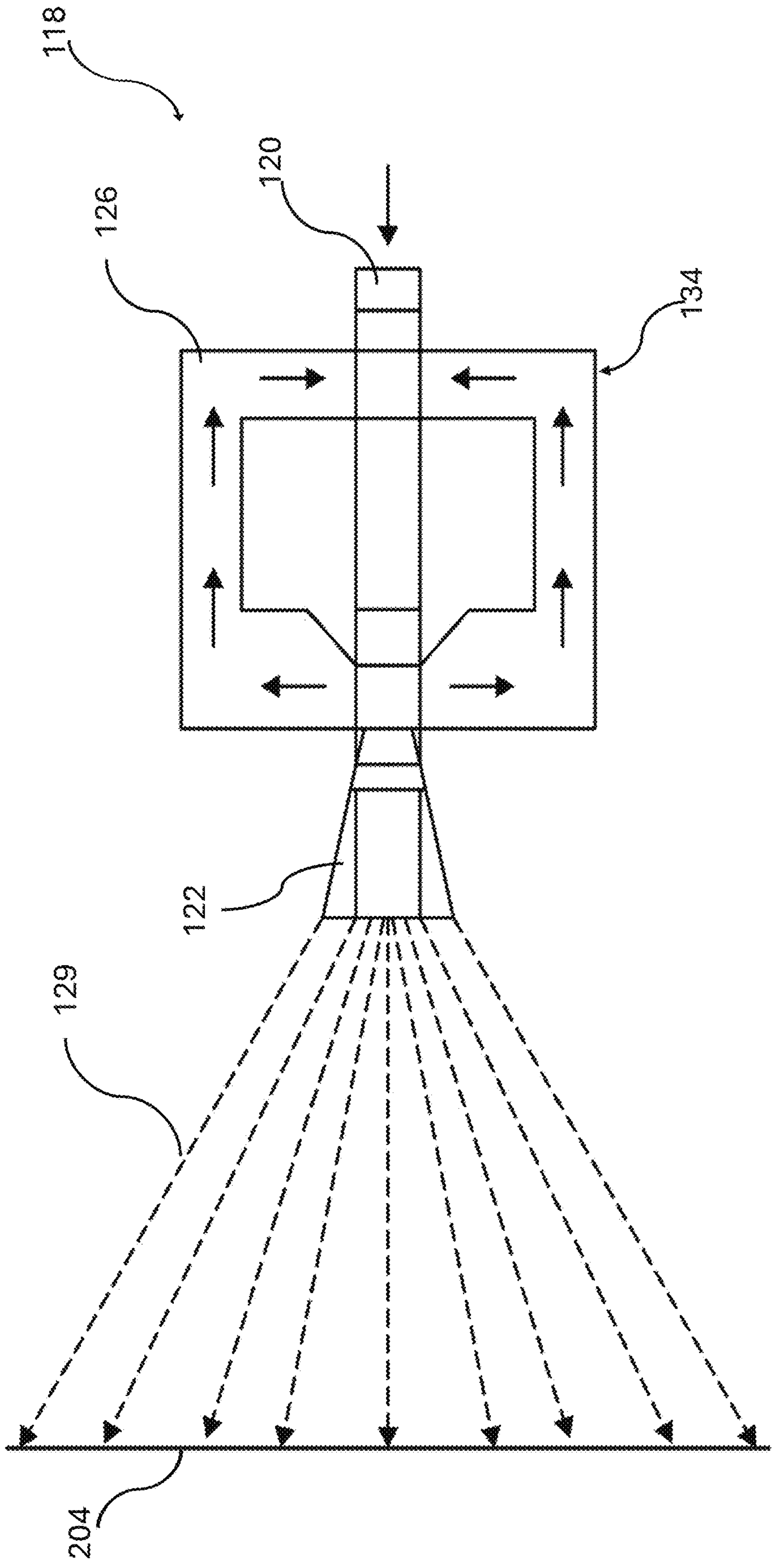
FIG. 6 illustrates a side view of the fluidic oscillator defining a second loop to induce a vertical sweeping motion, in accordance with an example of the present disclosure.

Referring to FIG. 5 and FIG. 6, the fluidic oscillator 118 includes a flow passage defining an internal flow network. The internal flow network is configured to split the cold stream towards at least two outlet passages 124 and 126. In one implementation, the internal flow network comprises curved bifurcation paths configured to induce a phase shift between the at least two oscillator jets 128 and 129 emitted from the at least two outlet passages 124 and 126. This phase shift causes the resultant jets to oscillate at different frequencies. The at least two oscillator jets 128 and 129 impinge upon the at least one gas turbine blade 204 and produce biaxial pulsating flow oscillations in vertical and horizontal planes.

In one implementation, the internal flow network is configured to define a first loop 132 and a second loop 134 within the fluidic oscillator 118. The internal flow network forms the foundation of the fluidic oscillator's functionality, facilitating the controlled movement of fluid through distinct feedback pathways to achieve desired oscillatory behaviors. A basic operating principle of the fluidic oscillator 118 is based on the dynamic switching of fluid between the first loop 132 and the second loop 134, which interact to produce complex sweeping jet patterns. These patterns enhance the distribution and coverage of the fluid stream when discharged from the fluidic oscillator 118, thereby improving thermal management capabilities. Sweeping jets are self-oscillating devices that operate on the Coanda effect, making them self-sustaining.

In one implementation, the mass flow entering the first loop 132 primarily induces a horizontal sweeping motion 128, as illustrated in FIG. 5. This horizontal movement results from the cyclic deflection of the fluid stream due to feedback-induced oscillations, enabling the jet to sweep across a surface in a lateral direction. Concurrently, a portion of the incoming mass flow is diverted into the second loop 134, which is configured to produce a vertical sweeping motion 129, as depicted in FIG. 6. The horizontal sweeping motion 128 and the vertical sweeping motion 129 creates a biaxial oscillation pattern of the at least two oscillator jets 128 and 129 emitted from the at least two outlet passages 124 and 126 that enhances the overall cooling area and efficiency.

In one implementation, the fluidic oscillator 118 comprises a nozzle 136 positioned at the second end 122 of the fluidic oscillator 118. In one implementation, the nozzle 136 being configured to direct the biaxial pulsating flow oscillations onto the surface of the at least one gas turbine blade 204. In one implementation, the nozzle 136 is a chevron-shaped nozzle.

In one implementation, the fluidic oscillator 118 is a double-sided fluidic oscillator configured to direct pulsating flow to opposing surfaces of the at least one gas turbine blade 204. The double-sided fluidic oscillator setup allows simultaneous bidirectional application of the at least two oscillator jets 128 and 129.

The cooling system 100 offers several distinct advantages that enhance its performance and reliability in gas turbine applications. One of the primary benefits is its ability to deliver biaxial pulsating flow oscillations onto the surface of at least one gas turbine blade 204 using the fluidic oscillator 118. The fluidic oscillator 118 generates at least two jets 128 and 129 that operate at different frequencies, producing both horizontal and vertical sweeping motions. The resulting biaxial flow pattern significantly increases the cooling surface area, leading to superior heat transfer and thermal regulation compared to conventional steady or unidirectional jet systems.

Another notable advantage is the system's use of the vortex tube 104, which separates compressed fluid from the compressor 102 into hot stream and cold stream without the need for refrigerants or complex mechanical components. This setup having the vortex tube 104 and without the requirement of any external power inputs reduces maintenance and operational costs. Additionally, the cooling system 100 is configured for flexibility in installation, allowing it to be integrated either internally within the turbine casing or externally, depending on the requirements.

The cooling system 100 can be implemented without requiring any modifications to the existing gas turbine design or its operating conditions. This ensures ease of integration and makes the system highly suitable for both retrofitting existing turbines and incorporating into new turbine models. Additionally, the improved cooling reduces thermal stresses on the gas turbine blades 204, thereby extending their service life and improving reliability over time.

The implementation of the cooling system 100 also helps minimize gas turbine downtime by reducing the frequency of maintenance and the likelihood of component failure. Furthermore, by enabling more effective cooling, the system 100 allows for the safe operation of the turbine 200 at higher inlet gas temperatures.

It should be imperative that the cooling system 100, the gas turbine 200, and any other elements described in the above description should not be considered as a limitation with respect to the figures. Rather, variations to such structures, and systems should be considered within the scope of the description.

While the invention has been described in connection with specific embodiments, it will be understood by those skilled in the art that numerous modifications and variations can be made without departing from the scope and spirit of the invention as set forth in the appended claims. Accordingly, the embodiments described herein are to be considered illustrative rather than limiting, and the true scope of the invention is defined by the following claims.

The invention claimed is:

1. A cooling system for a gas turbine, the cooling system comprising:

a vortex tube defining a body having an inlet port connectable to a compressor to receive compressed fluid, the vortex tube being configured to separate flow of the compressed fluid into a cold stream and a hot stream; and a fluidic oscillator in fluid communication with the vortex tube, the fluidic oscillator defining a first end, a second end, and at least two outlet passages, wherein the first end being connected to a cold stream outlet port of the vortex tube to receive the cold stream, and the fluidic oscillator being configured to generate at least two oscillator jets of the cold stream, operating at different oscillation frequencies, to produce biaxial pulsating flow oscillations onto a surface of at least one gas turbine blade of the gas turbine.

2. The cooling system according to claim 1, wherein the at least two outlet passages are oriented orthogonal to one another.

3. The cooling system according to claim 1, wherein the at least two outlet passages of the fluidic oscillator are configured to generate at least two oscillator jets.

4. The cooling system according to claim 1, wherein the fluidic oscillator includes a flow passage defining an internal flow network configured to split the cold stream toward the at least two outlet passages.

5. The cooling system according to claim 4, wherein the internal flow network comprises curved bifurcation paths configured to induce a phase shift between the at least two oscillator jets emitted from the at least two outlet passages.

6. The cooling system according to claim 1, wherein the fluidic oscillator comprises a nozzle positioned at the second end, the nozzle being configured to direct the biaxial pulsating flow oscillations onto the surface of the at least one gas turbine blade.

7. The cooling system according to claim 1, wherein the at least two oscillator jets produce biaxial sweeping jet patterns in vertical and horizontal directions over the surface of the at least one gas turbine blade.

8. The cooling system according to claim 1, wherein the fluidic oscillator is a double-sided fluidic oscillator configured to direct pulsating flow to opposing surfaces of the at least one gas turbine blade.

9. The cooling system according to claim 1, wherein the vortex tube comprises a hot stream outlet port having a throttle valve configured to control the temperature and flow rate of the cold stream.

10. The cooling system according to claim 1, wherein the fluidic oscillator is configured to be received within an internal cavity of the at least one gas turbine blade of the gas turbine.

11. A gas turbine comprising:

at least one gas turbine blade; and a cooling system in fluidic communication to the at least one gas turbine blade, the cooling system comprising:

a vortex tube defining a body having an inlet port connectable to a compressor to receive compressed fluid, the vortex tube being configured to separate flow of the compressed fluid into a cold stream and a hot stream; and a fluidic oscillator in fluid communication with the vortex tube, the fluidic oscillator defining a first end, a second end, and at least two outlet passages, wherein the first end being connected to a cold stream outlet port of the vortex tube to receive the cold stream, and the fluidic oscillator being configured to generate at least two oscillator jets of the cold stream, operating at different oscillation frequencies, to produce biaxial pulsating flow oscillations onto a surface of the at least one gas turbine blade of the gas turbine.

12. The gas turbine according to claim 11, wherein the at least two outlet passages are oriented orthogonal to one another.

13. The gas turbine according to claim 11, wherein the fluidic oscillator includes a flow passage defining an internal flow network configured to split the cold stream toward the at least two outlet passages.

14. The gas turbine according to claim 13, wherein the internal flow network comprises curved bifurcation paths configured to induce a phase shift between the at least two oscillator jets emitted from the at least two outlet passages.

15. The gas turbine according to claim 11, wherein the fluidic oscillator comprises a nozzle positioned at the second end, the nozzle being configured to direct the biaxial pulsating flow oscillations onto the surface of the at least one gas turbine blade.

16. The gas turbine according to claim 11, wherein the at least two oscillator jets produce biaxial sweeping jet patterns in vertical and horizontal directions over the surface of the at least one gas turbine blade.

17. The gas turbine according to claim 11, wherein the fluidic oscillator is a double-sided fluidic oscillator configured to direct pulsating flow to opposing surfaces of the at least one gas turbine blade.

18. The gas turbine according to claim 11, wherein the vortex tube comprises a hot stream outlet port having a throttle valve configured to control the temperature and flow rate of the cold stream.

19. The gas turbine according to claim 11, wherein the fluidic oscillator is configured to be received within an internal cavity of the at least one gas turbine blade of the gas turbine.

* * * * *